United States Patent [19]

Fujiwara et al.

[11] Patent Number: 4,832,832
[45] Date of Patent: May 23, 1989

[54] PRESSURE TYPE SLIT SCREEN

[75] Inventors: Haruyoshi Fujiwara, Hiroshima; Ryojiro Katsube, Mihara, both of Japan

[73] Assignee: Mitsubishi Jukogyo Kabushiki Kaisha, Tokyo, Japan

[21] Appl. No.: 897,008
[22] PCT Filed: Dec. 23, 1985
[86] PCT No.: PCT/JP85/00702
 § 371 Date: Jul. 30, 1986
 § 102(e) Date: Jul. 30, 1986
[87] PCT Pub. No.: WO86/03688
 PCT Pub. Date: Jul. 3, 1986

[30] Foreign Application Priority Data

Feb. 8, 1985 [JP] Japan .................. 60-21933
Dec. 25, 1985 [JP] Japan .................. 59-277892

[51] Int. Cl.⁴ ............................................ B07B 1/20
[52] U.S. Cl. .................................. 209/273; 209/306; 209/397
[58] Field of Search ............... 209/270, 273, 283, 306, 209/383, 397; 162/55

[56] References Cited

U.S. PATENT DOCUMENTS

| | | | |
|---|---|---|---|
| 3,363,759 | 1/1968 | Clarke-Pounder | 209/273 |
| 3,483,974 | 12/1969 | Pearsall | 209/273 |
| 4,276,159 | 6/1981 | Lehman | 209/273 |
| 4,318,805 | 3/1982 | Le Blanc | 209/273 |
| 4,356,085 | 10/1982 | Schön et al. | 209/273 |

Primary Examiner—Sherman D. Basinger
Assistant Examiner—Edwin L. Swinehart
Attorney, Agent, or Firm—Wenderoth, Lind & Ponack

[57] ABSTRACT

A slit screen that is simple to manufacture and excellent in working precision, which includes a screen cylinder in which at least one side of inlet corner portions of slit openings is subjected to chamfering and a cylindrical rotor rotatably disposed on the inside of the screen cylinder and having a large number of protrusions on its surface on the side thereof facing the screen cylinder. The screen cylinder can be made from a plurality of spaced-apart, identical extruded bars of suitable cross-section joined to upper and lower supports. The protrusions on the cylindrical rotor can be non-metallic elastic inserts mounted on a rotor drum.

20 Claims, 16 Drawing Sheets 25 26 24

25 26 24

25 26 24

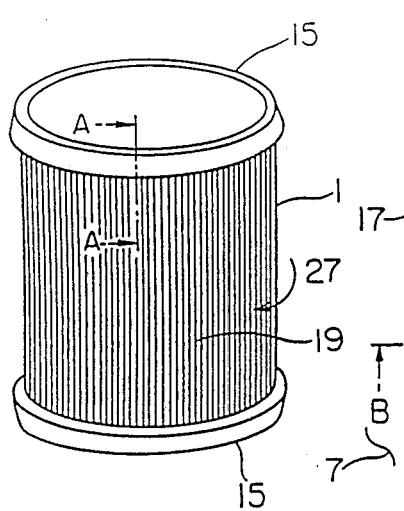
FIG. 13
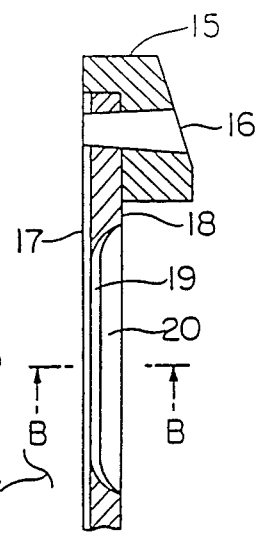
FIG. 14
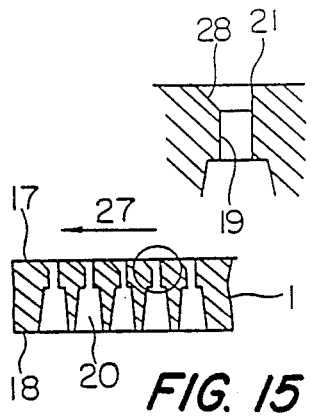
FIG. 16
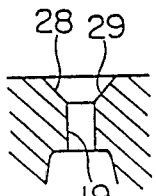
FIG. 15
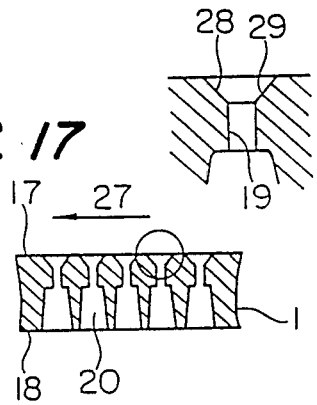
FIG. 17
FIG. 18
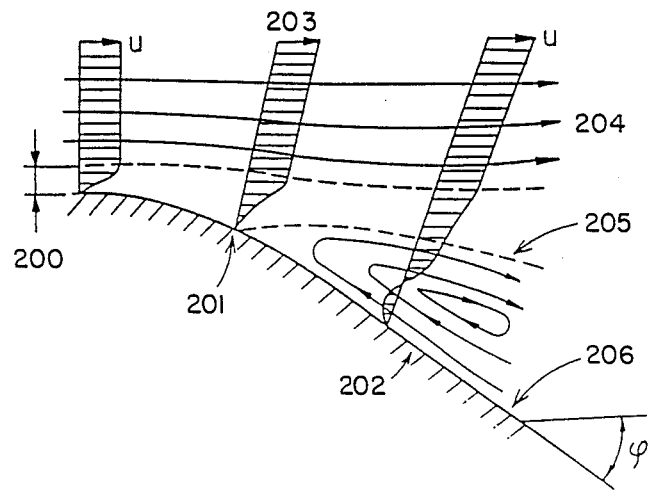
FIG. 19

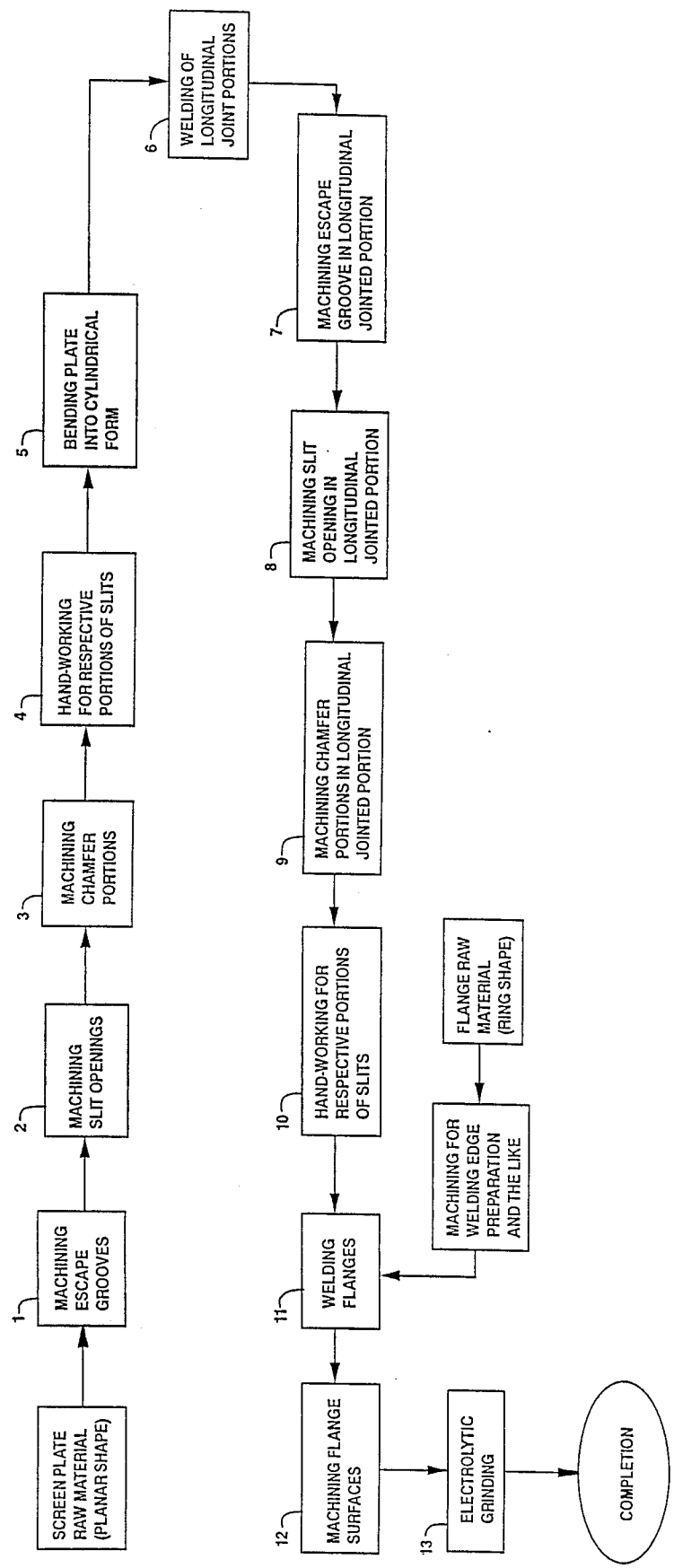

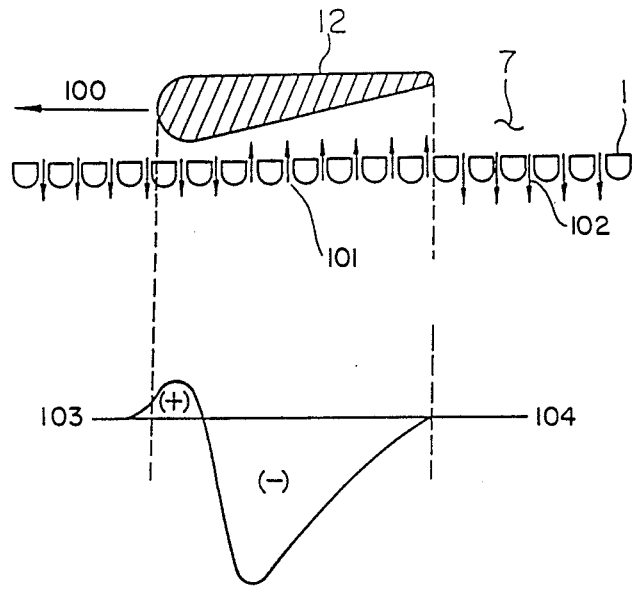
FIG. 37
PRIOR ART
FIG. 38
PRIOR ART
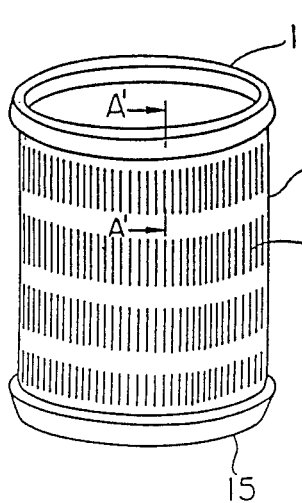
FIG. 39
PRIOR ART
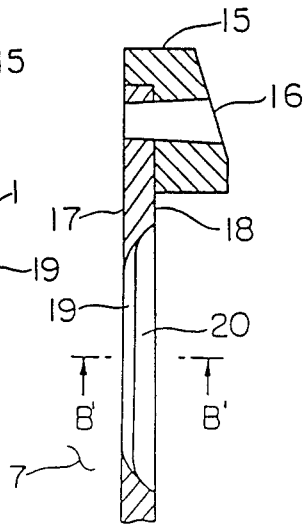
FIG. 41
PRIOR ART
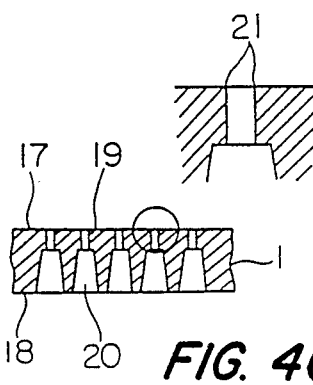
FIG. 40
PRIOR ART

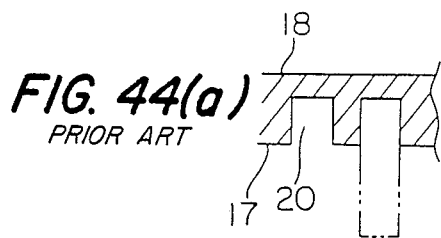
FIG. 44(a) PRIOR ART
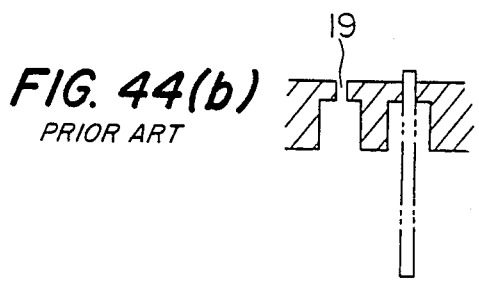
FIG. 44(b) PRIOR ART
FIG. 44(g) PRIOR ART
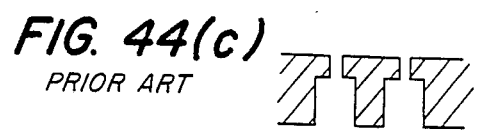
FIG. 44(c) PRIOR ART
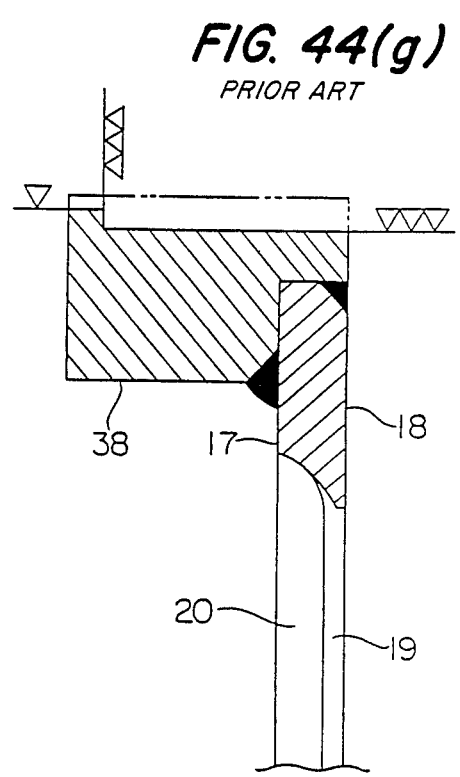
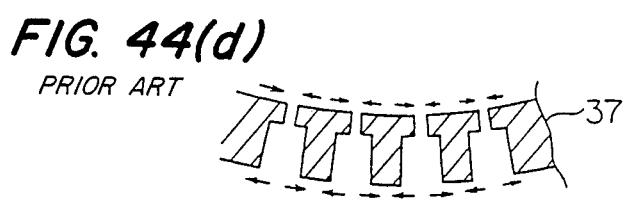
FIG. 44(d) PRIOR ART
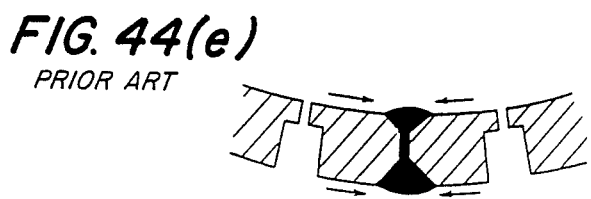
FIG. 44(e) PRIOR ART
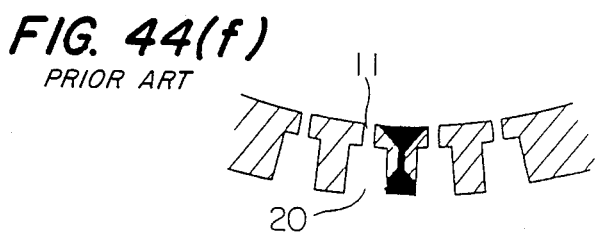
FIG. 44(f) PRIOR ART

PRESSURE TYPE SLIT SCREEN

FIELD OF THE ART

The present invention relates to a pressure type slit screen for removing coarse fibers, bound materials and other foreign matter mixed in paper material. The present invention can be applied to a centrifugal screen, a centrifugal sorter, a barrier screen and the like.

BACKGROUND OF THE INVENTION

A pressure type slit screen well known in the prior art is provided with a screen cylinder 1 having elongated slit-like openings as shown in FIGS. 35 and 36. Paper material supplied by means of a pump flows in through an inlet section 2, advances to a flow passage 4 surrounding an outer circumference formed by an inside casing 3, and heavy foreign matter such as metal pieces, sand and the like in the paper material is discharged outside of the system through a trap 5 provided in a tangential direction opposite to the inlet section 2. Paper material circulating through the flow passage 4 enters into an annular screening chamber 7 formed of the screen cylinder 1 and a bearing cylinder 6 from its top portion in the direction shown by arrow 8, then it is selectively filtered while passing through the screen cylinder 1 in the process of flowing downwards, and it is discharged through an outlet section 9.

On the other hand, foreign matter such as plastics, bound fibers, wood pieces, etc. having a size unable to pass through the screen cylinder 1, would flow down by themselves through the screening chamber 7, and would be discharged through a reject outlet section 10. In addition, hydrofoil members 12 (FIGS. 42 and 43) suspended from a top of a main shaft 11 and driven by an electric motor 13 revolve continuously at a high speed along the surface of the screen cylinder to stir the paper material and remove unpassable foreign matter on the screen cylinder surface, whereby they serve to always keep the screen cylinder clean, and at the same time they disintegrate fiber flocks produced as a result of mutual aggregation of fibers by strongly stirring and promote the flow of fibers passing through the screen cylinder.

Also in FIGS. 38 and 39, to the opposite ends of the cylindrical screen cylinder 1 are mounted taper rings 15 for equipping it in a main body of a screen apparatus, by means of taper pins 16. The screen cylinder 1 is provided with circumferentially extending rows of a large number of slit openings 19 each of which extends parallel to the rotational axis of the screen cylinder. On a surface 17 of the screen facing the screening chamber 7 are provided slit openings 19 which are straight in the direction of thickness of the screen cylinder and formed by walls which are separated from each other by a preliminarily defined dimension and which are parallel to each other, and inlet corner sections 21 where the surface of the screen cylinder and the parallel walls intersect nearly at right angles.

On a rear surface 18 of the screen cylinder 1 are provided escape grooves 20 having a sufficiently large opening dimension as compared to the slit opening 19. FIG. 42 shows a structure of a screen cleaning device in the prior art, in which the hydrofoil members 12 are assembled by means of a spider 22 and a reinforcement ring 23 and they are mounted to move along a circular path across the surface of the screen cylinder.

However, in order to obtain predetermined stirring and cleaning effects based on the principle of the hydrofoil, it is necessary to extremely narrow the gap clearance between the hydrofoil member 12 and the screen cylinder to as small as 1.5–2.5 mm and to drive the hydrofoil members at a high speed of 10 m/sec. to 30 m/sec. To that end, additional support members and reinforcement members are necessitated for the purpose of assuring a rigidity for withstanding the high-speed rotation, and upon assembly also, a high degree of technique is required. Such support members and reinforcement members had various shortcomings such that since they form surface portions which cause adhesion and binding of fibers in paper material, and since they result in large power loss, counter-measures against pulsations were necessitated.

As described above, in the pressure type slit screen in the prior art, a pulsated pressure consisting of a positive pressure and a negative pressure is generated according to the principle of the hydrofoil by moving the hydrofoil members 12 along the surface of the screen cylinder 1 facing the screening chamber 7 with a narrow gap clearance held therebetween, whereby paper material is stirred and clogging of the screen plate is prevented, as shown in FIG. 37 (wherein 100 represents the direction of revolving, 101 represents clogging fiber flocks are removed, 102 represents effective flow water component, 103 represents pressure distribution and 104 represents screen inner pressure). Accordingly, the hydrofoil members 12 are revolved in order to obtain a predetermined pulsated pressure, then the paper material liquid stirred by the hydrofoils is not limited to that existing between the hydrofoils and the screen cylinder 1, but even the paper material liquid existing at a place further remote from the hydrofoils in the radial direction is stirred. Hence, power consumption for effecting necessary stirring is large.

While the power consumption is large as described above, an efficiency of power for passing paper material is lowered because the maximum stirring is effected in the neighborhood of the hydrofoils. In order to compensate for this, the hydrofoil members 12 are placed close to the surface of the screen cylinder 1. In this case, for the purpose of preventing interference between the cylinder 1 and the hydrofoil members 12 caused by torsion, these members 12 are constructed rigidly. Accordingly, if hard foreign matter should come in as mixed with the paper material liquid and should be caught between the cylinder 1 and the hydrofoil members 12, then serious damage would occur to both component members, and especially to the cylinder 1.

As described above, despite of the fact that the hydrofoil members 12 are provided in the proximity of the cylinder 1, the stirring at the surface of the cylinder 1 is insufficient, hence fibers to be passed through the cylinder 1 would flow out through the reject outlet 10, and a yield of fibers would be lowered. There was a shortcoming that the above-mentioned tendency would become more remarkable in the case of high-quality long fibers.

The hydrofoil member 12 is continuous in the direction of its rotational axis, and it passes intermittently through the proximities of the paper material outlet 9 or inlet 2. At this moment, a pressure wave shown in FIG. 37 is made to propagate through paper material pipings, and when it reaches a headbox of a paper machine, variation of a mass per unit area would occur in the direction of a flow of paper, that is, the so-called pressure pulsation problem would arise. In this case, as the power necessitated for driving the hydrofoil members 12 becomes larger, the greater becomes the energy of pressure pulsation, and therefore, the problem would become more remarkable, resulting in a shortcoming that the countermeasure for absorbing the pulsation would become more difficult.

Now, a method for making the above-described screen cylinder will be explained with reference to FIGS. 44 and 45. It is to be noted that symbols (a)–(f) in the following description correspond to symbols (a)–(f) indicated in FIG. 44:

(a) Escape grooves 20 are formed by machining them in a flat plate at a predetermined pitch.

(b) Slit openings 19 are formed by machining them nearly at the centers between the escape grooves so as to have a predetermined slit width.

(c) Edge portions and burrs at the opposite ends of the slit openings 19 are removed by means of a file or the like.

(d) A screen plate 37 is bent precisely so as to have a predetermined diameter.

(e) Joint portions in the longitudinal direction of the screen plate 37 are fixed by welding. Projected portions are removed so that a welding bead becomes flush with the surface.

(f) An escape groove 20 and a slit opening 19 are formed in the jointed portions in the longitudinal direction of the screen plate.

(g) Flanges 38 are mounted to the opposite ends of the screen plate, and the flange surface is machined into a predetermined dimension.

The method of making the screen cylinder of the prior art as described above, had the following serious shortcomings:

(a) Precision in a gap clearance of the slit openings was poor:

Here, the term "precision in a gap clearance" can be defined depending upon what extent of distribution the width dimensions of the slit openings in the screen cylinder in a finished state have with respect to the predetermined slit width. It is to be noted that in the case where the finished dimension of the slit opening width is broader than the predetermined slit width, a capability of removing foreign matter is lowered, while in the case where it is narrower than the predetermined slit width, a capability of processing paper material is lowered, and hence in either case it is disadvantageous.

Here, distribution curves to be referred to for explanation are shown in FIG. 46. Curve (a) corresponds to FIG. 44 and FIG. 45(a), in which since machining is effected with a cutter having a width equal to the predetermined slit width, an average value nearly coincides with the predetermined slit width, and a distribution is also, small. On the other hand, curve (b) corresponds to FIG. 44(b), in which since the inner diameter side is contracted due to the bending work, the slit width is narrowed, the average value is shifted, and also the distribution becomes large. In addition, curve (e) corresponds to FIG. 44(e), in which due to local contraction caused by heating upon welding of the jointed portions, the distribution becomes further increased and the precision in a gap clearance is lowered. Lowering of a precision in a gap clearance in the subsequent manufacturing steps is very little. Generally, the extent of shift of the average value of the distribution curve ("C" in FIG. 46) falls in the range of 10–20% of the predetermined slit width.

(b) A number of working steps was large and a working efficiency was poor:

Since the opposite ends of the slit opening form edges, if they are kept intact, then fibers in paper material would tangle therewith, resulting in clogging of the slit portions, and the slit portions would not be able to be used. Consequently, it was necessary to remove the edge portions by means of a file as shown in FIG. 44 and in FIG. 45(c). However, this work is hand work, and so, the working efficiency was very poor.

In addition, in the machining of a slit in the jointed portions in the longitudinal direction of the screen plate also, the machining work could not be automated and the machining efficiency was poor due to the fact that the screen plate is cylindrical. Furthermore, the slit machining by the machining means would result in a coarse roughness of the machined surface as well as burrs at the machined end portions, so that if the machined state is kept intact, then fibers in the paper material would tangle therewith. Accordingly, it was necessary to subject the machined surface to electrolytic grinding to smoothen it. Consequently, the number of working steps was increased and the working time was prolonged, and therefore, there was a shortcoming in that a highly expensive screen cylinder resulted.

Still further, in the case of making a screen cylinder in which screen openings 19 are chamfered through the above-mentioned process, there were problems in that the number of working steps was further increased, and that a screen cylinder having a narrow screen width would become difficult to manufactured.

SUMMARY OF THE INVENTION

Accordingly, one object of the present invention is to provide a pressure type slit screen in which the above-described problems in the prior art have been resolved.

Another object of the invention is to provide a pressure type slit screen which has such a structure that even though a driving power is small, paper material would not clog the surface of the screen cylinder.

Furthermore, it is intended to provide a pressure type slit screen in which foreign matter would scarcely enter between a screen cylinder and a rotor and thereby damage of the surface of the screen cylinder can be prevented.

Also, it is intended to provide a pressure type slit screen in which a protrusion section is formed of non-metallic elastic material and can be freely mounted to a rotor, thereby damage of a screen cylinder can be better prevented and replacement thereof is facilitated.

Still further, it is intended to provide a pressure type slit screen in which fibers are made to readily flow jointly with liquid through openings in a screen cylinder and thereby a yield of fibers is improved.

It is also intended to provide a process for working and a structure of a screen cylinder that is easy to be worked and that has an excellent working precision.

In order to achieve the above-mentioned objects, the present invention provides a screen cylinder characterized by the provision of a screen cylinder in which at least one side of inlet corner sections of a slit opening section is subjected to chamfering, and a cylindrical rotor that is rotatably disposed on the inside of the same screen cylinder and that has a large number of protrusions on its surface on the side thereof facing the above-mentioned screen cylinder.

BRIEF DESCRIPTION OF THE DRAWINGS

FIG. 13 is a perspective view of a screen cylinder illustrating one preferred embodiment of the present invention, FIG. 14 is a cross-section view taken along line A—A in FIG. 13, FIG. 15 is a cross-section view taken along line B—B in FIG. 14, FIG. 16 is an enlarged view of an encircled portion in FIG. 15, FIG. 17 is a cross-section view taken along line B—B in FIG. 15 of another preferred embodiment different from FIG. 15, FIG. 18 is an enlarged view of an encircled portion in FIG. 17, FIG. 19 is a velocity distribution diagram in a stirring region, FIG. 32 is a block diagram showing a method for making a screen cylinder in the prior art, FIG. 37 is a diagrammatic view showing a relation between a screen cylinder and hydrofoil members in FIG. 36, FIG. 38 is a perspective view of a screen cylinder in the prior art, FIG. 39 is a cross-section view taken along line A'—A' in FIG. 38, FIG. 40 is a cross-section view taken along line B'—B' in FIG. 39, FIG. 41 is an enlarged view of an encircled portion in FIG. 40.

DETAILED DESCRIPTION OF THE PREFERRED EMBODIMENTS

Figure 1:
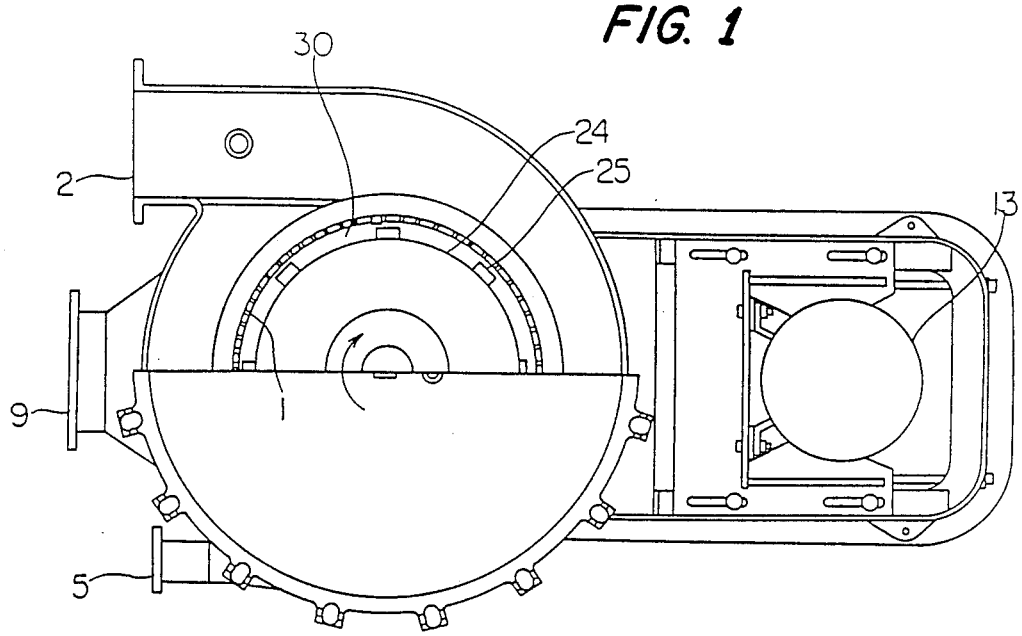
FIG. 1 is a plan view partly in cross-section of a pressure type slit screen illustrating one preferred embodiment of the present invention.
Figure 2:
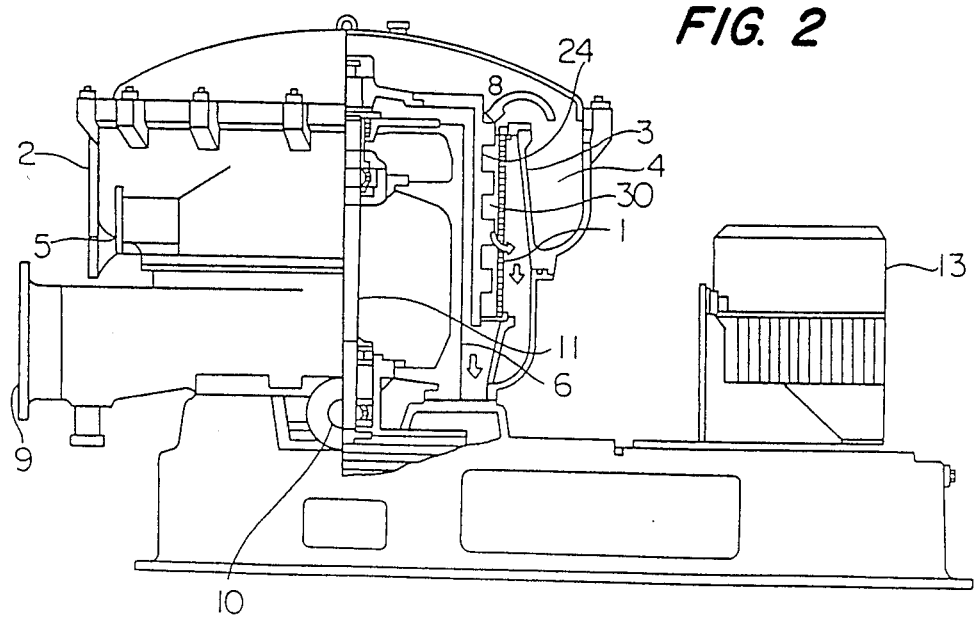
FIG. 2 is a front view partly in cross-section of the same.
Figure 36:
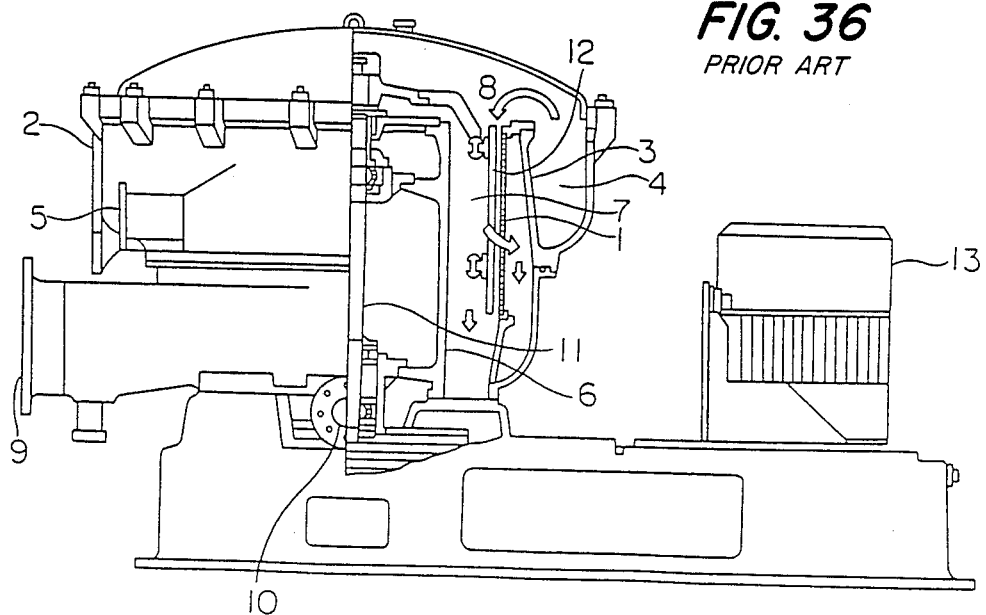
FIG. 36 is a front view partly in cross-section of the same.
Figure 42:
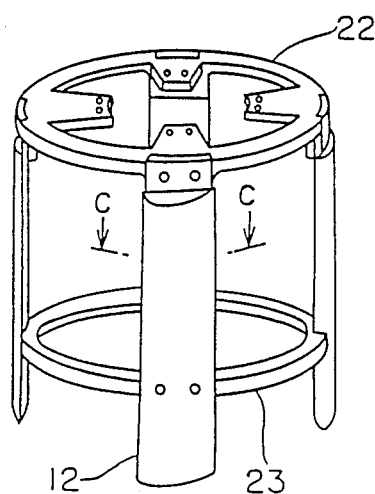
FIG. 42 is a perspective view showing hydrofoil members in the prior art.
Figure 43:
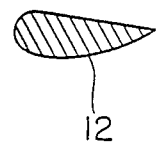
FIG. 43 is a cross-section view taken along line C—C in FIG. 42, FIGS. 44(a), 44(b), 44(c), 44(d), 44(e), 44(f) and 44(g) and FIGS. 45(a), 45(b) and 45(c) are diagrammatic views sequentially showing one example of a method for making a screen cylinder in the prior art.
Figure 45A:
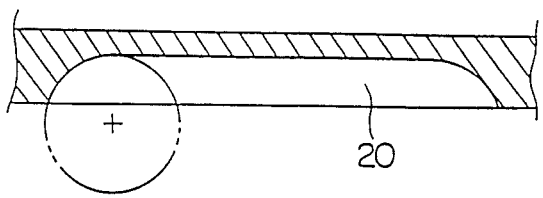
Figure 45B:
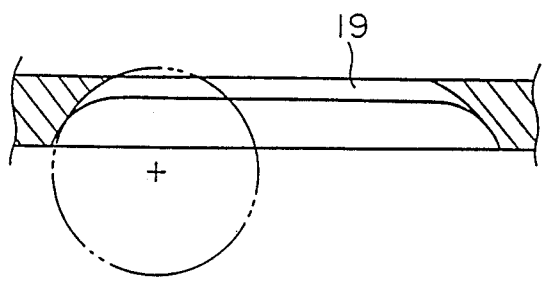
Figure 45C:
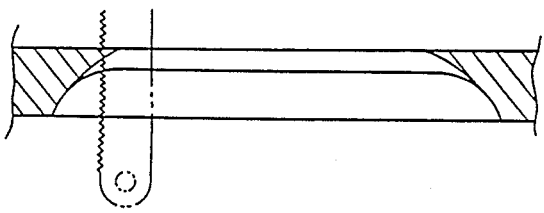

Explaining now with reference to FIGS. 1 and 2, a screen cleaning device is constructed in a form of a rotor drum 24 that is concentric with and facing a cylindrical surface of a screen cylinder 1 with a stirring chamber 30 therebetween and the surface, and of the rotor drum facing the stirring chamber 30 is provided with protrusions 25 having free ends in close proximity to the screen surface for the purpose of stirring of paper material accompanying its rotation and generating an associated circulating flow. It is to be noted that component parts designated by reference numerals 1-11 and 13 are identical to those in the prior art apparatus shown in FIG. 36 and hence detailed description thereof will be omitted here.

Figure 4:
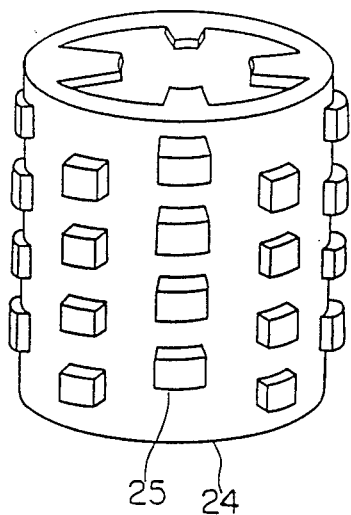
FIGS. 3, 4, 5, 6, 7, 8 and 9 are perspective views of a rotor drum respectively illustrating preferred embodiments of the present invention.
Figure 3:
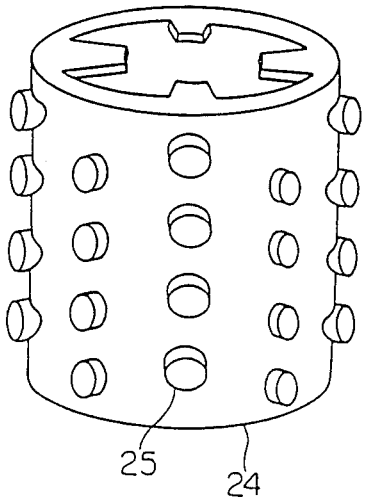
Figure 5:
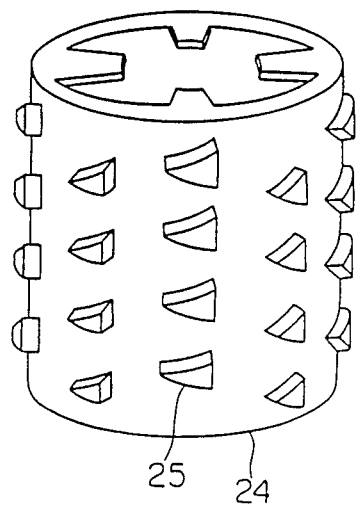

FIGS. 3-5 show preferred embodiments of a screen cleaning device according to the present invention. In these figures, shapes, sizes and positions on the rotor drum surface are determined taking into consideration such factors that tangle of fibers should not occur, that macroscopic stirring should be effected sufficiently, that an associated circulating flow accompanying rotation of a rotor drum should be generated sufficiently, that it can be manufactured easily, and the like. While illustration is made in FIGS. 3-5 with respect to the cases where the shapes of the protrusions 25 are circular columns, rectangular columns and triangular columns, the shape of the protrusions should not be limited to these.

Figure 10:
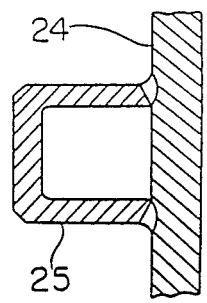
FIG. 10 is a cross-section view taken along line X—X in FIG. 9, FIGS. 11 and 12, respectively, are cross-section side views of elastic protrusion sections which are different from that shown in FIG. 10.

Generally, the rotor drum and the protrusions are both made of metallic material such as stainless steel, and as shown in FIG. 10, the protrusions 25 are mounted to the rotor drum 24 by welding. In this method, in the event that hard foreign matter such as metal pieces or sand having a size as large as the gap clearance between the screen cylinder surface and the protrusions should be mixed and caught in the gap clearance, or in the event that the protrusions and the screen cylinder surface should come into contact with each other during operation due to any cause, there is a danger that serious damage may arise on the screen cylinder surface.

Figure 11:
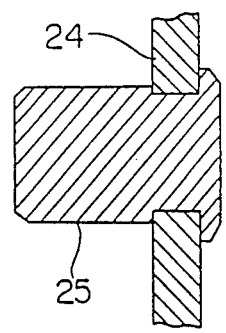
Figure 12:
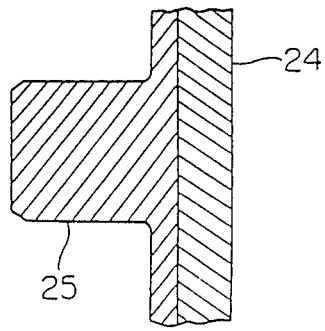

In order to eliminate these problems, in the rotor according to the present invention it is possible that the protrusions are made of non-metallic elastic material such as urethane rubber and they are mounted to the rotor drum through the process of fitting, bonding, etc. as shown in FIGS. 11 and 12. By employing this method, damage on the screen cylinder surface can be perfectly prevented.

Figure 7:
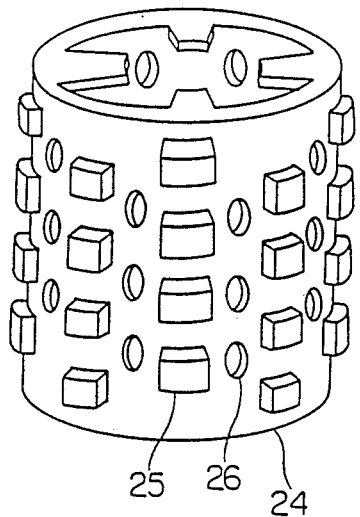
Figure 6:
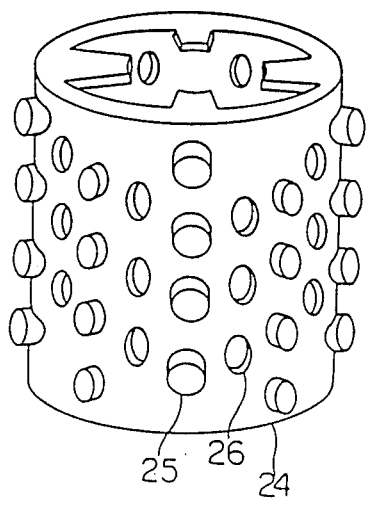
Figure 8:
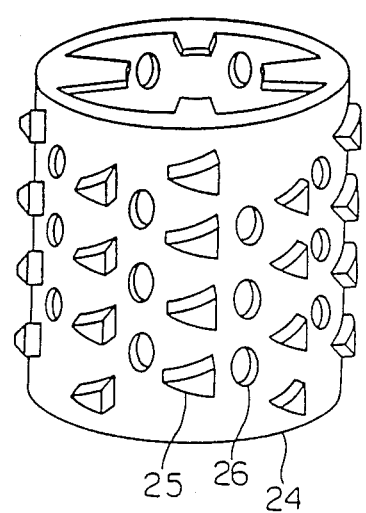
Figure 9:
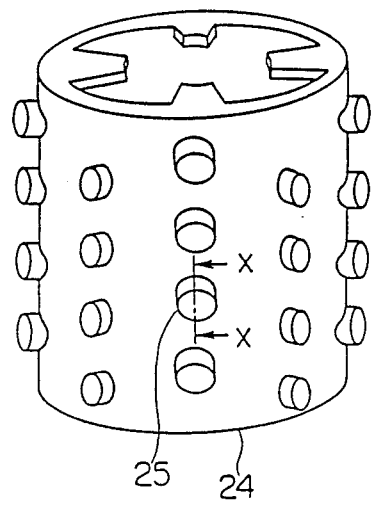

In addition, the rotor drum can be provided with openings 26 as shown in FIGS. 6–8. By providing these openings 26, paper material within a stirring chamber and supplied paper material would be locally interchanged, resulting in an effect of promoting macroscopic stirring within the stirring chamber. It is to be noted that the shape, size and number of the openings 26 can be chosen arbitrarily.

A structure of a screen cylinder which was disclosed and claimed in our previous Japanese Utility Model Application No. 58-108190, as illustrated in FIGS. 13–16. At first, as shown in FIG. 15, in the case where an associated circulating motion of paper material accompanying rotation of a rotor drum 24 in a circumferential direction is directed in the direction of arrow 27, an inlet corner portion formed by an intersection of one wall of a slit opening and the cylindrical surface of the screen 1 on the downstream side of the flow is subjected to chamfering 28 as shown in FIG. 16. Thus, each slit opening is formed by a pair of walls extending into the screen 1 from the surface of the screen and the walls are spaced further apart in a direction towards the surface of the screen facing the stirring chamber 30 since one of the walls 21 extends perpendicularly to the screen surface and the other one of the walls 28 tapers such that the slit opening 19 becomes larger in a direction towards the surface of the screen. A depth in the thicknesswise direction of the screen cylinder 1 of the chamfer 28 and an inclination angle of the chamfer 28 with respect to a normal line of the screen cylinder 1 could be chosen arbitrarily, but they are selected in such manner that a stirring region produced by the chamber 28 may reach an inlet of a slit or screen opening 19. It is to be noted that if the chamfer is made too large, then at the inlet of the screen opening 19, a stirring flow caused by separation would be greatly attenuated, and so, it is undesirable.

Another preferred embodiment is shown in FIGS. 17 and 18. In these figures, in the case where the associated circulating motion of paper material is directed in the direction of arrow 27, inlet corner portions on the downstream side and upstream side of the flow are respectively subjected to chamfering 28 and 29. With reference to FIGS. 17 and 18, the chamfers 28 and 29 are formed symmetrically with respect to a center line, but they could be asymmetric. In addition, the depths and inclination angles of the chambers 28 and 29 can be selected arbitrarily, like the preferred embodiment illustrated in FIGS. 15 and 16. It is to be noted that with respect to a structure of a pressure type slit screen, while a main shaft 11 is a vertical shaft in FIG. 2, it could be a horizontal shaft, and with respect to a screen cylinder also, though a screen cylinder 2 is present outside of a rotor drum 24 in FIG. 2 so that paper material may be passed from the inside to the outside, on the contrary the protrusions 25 could be provided on the inside surface of the rotor drum 24, the screen cylinder could be disposed on the inside thereof and paper material could be passed from the outside to the inside. Or else, protrusions could be provided on both the inner and outer surfaces of the rotor drum, and screen cylinders could be provided on the inside and outside thereof.

Now, explaining the operation, as shown in FIG. 19 (wherein 200 represents a boundary layer: $\delta$, 201 represents a point of separation, 202 represents a stirring region, 203 represents a velocity distribution, 204 represents an associated circulating flow water, 205 represents a discontinuous surface of velocity and 206 represents a flow passageway), in an enlarging portion of a flow passageway, as an angle $\phi$ becomes large, a pressure gradient within a boundary layer becomes unstable, and sometimes the boundary layer would separate from the surface of the flow passageway, this being generally known as a separation phenomenon. At this separating portion, a swirl flow in the direction of flowing inversely along the surface of the flow passageway would be produced, and since this has a strong stirring effect, this region is called "stirring region" in this specification.

According to the present invention, in contrast to the fact that in the prior art, stirring of paper material caused by the hydrofoil member 12 acts upon the entire region of the broad annular screening chamber 7, stirring caused by the rotor acts upon only the paper material within a thin annular stirring chamber 30 formed by the surface of the screen cylinder and 1 and the rotor drum 24, and hence, an associated circulating flow of paper material and macroscopic stirring within the stirring chamber can be realized efficiently.

In order that the separation phenomenon may be produced by making use of this associated circulating flow, inlet corner portions of the slit openings 19 are subjected to chamfering as shown at 28 in FIG. 16 or at 28 and 29 in FIG. 18, thereby strong stirring regions are generated in the slit inlet openings with a low power consumption, and selection is effected by making paper material pass through the slit openings 19 but making foreign matters larger than the slit openings 19 not pass through them.

Now a method of making and a structure of the above-described screen cylinder will be described in detail with reference to FIGS. 26–33. In the case where an associated circulating motion of paper material accompanying rotation of a wheel is directed in the direction of arrow 47 (FIG. 29) in these figures, drawn materials having such cross-section configuration that chamfers may be formed at the inlet corner portions of the slits on the downstream side of the flow, are fabricated. Then, bending of the same drawn materials is corrected, and elongated rod-like members 48 which are identical in cross section are produced by cutting the drawn material held at a state having a high straightness into predetermined lengths (dimensions D in FIG. 27), are prepared by a necessary number. On the other hand, in an upper side annular support flange 49 and a lower side annular support flange 50 are provided a groove 53 having a width nearly equal to the height of the rod-like members 48 (dimensions E in FIG. 29) and a guide groove 54 for fixing a guide ring 51. In addition, working of a flange surface that is necessitated for assembly of the screen cylinder is also preliminarily finished into a predetermined dimension.

Figure 30:
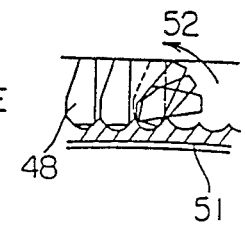
FIG. 30 is a diagrammatic view showing the state of assembling rod-shaped members in FIG. 29, FIGS. 31(a), 31(b) and 31(c) are diagrammatic views showing a sequence of fixing of the same flange and rod-shaped members.
Figure 31:
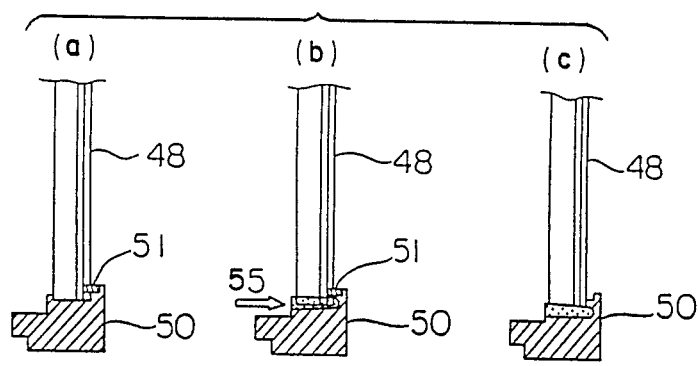

In order that the rod-like members 48 are assembled in a cylindrical shape with a predetermined slit width formed by a pair of walls extending inwardly from the surface of the screen, each wall of the pair of walls being formed by a respective surface of one of the elongated members, if the guide ring 51 is employed, positioning can be achieved precisely and efficiently. As shown in FIG. 30, in the case where each of the rod-like members 48 has the cross-section configuration employed in the illustrated embodiment wherein each of the elongated members is thinner in cross section in a direction towards the screen surface facing the mixing chamber and one of the walls forming one of the slit openings is an upstream surface of one of the elongated members which extends perpendicularly from the surface of the screen, if the shape of the guide ring 51 is chosen to be sawtooth-like, then when they are assembled as being rotated in the direction of arrow 52, conveniently they become unable to rotate further at a regular position. It is to be noted that since the slit width and the precision in a gap clearance of the screen cylinder are determined principally depending upon the shape of the guide ring 51 and its precision, fabrication of the guide ring 51 is necessitated to be especially precise, and for example, a stainless steel plate of 1 mm in thickness could be worked by means of a laser beam working machine provided with a programmable numerical control device.

With regard to the procedure of assembling, at first guide rings 51 are mounted respectively in guide grooves 54 of support means for supporting the elongated members 48 comprising a pair of spaced-apart support members such as the upper side flange 49 and the lower side flange 50. Subsequently, the upper and lower flanges are assembled by making use of an appropriate jig (not shown) so that the distance between the bottoms of the opposed grooves 53 of the flanges may become nearly equal to the lengths (dimensions D in FIG. 27) of the rod-like members 48. Furthermore, the rod-like members 48 are sequentially inserted into the grooves of the flanges such that the support members 49, 50 are located at opposite ends of the elongated members 48, then they are rotated in the direction of arrow 52 in FIG. 30, and they are fixed at the positions where they take regular attitudes. Subsequently, when the assembly of all the rod-like members 48 has been finished, the rod-like members are constrained by means of a jig so that they cannot move.

When the assembly has been finished, next the upper and lower flanges 49 and 50 and the rod-like members 48 are fixed with each other. FIG. 31(a) show the state where the assembly has been finished, and then as shown in FIG. 31(b), joint portions are fixed by welding in the direction of arrow 55. Upon selection of a welding method, a method in which edge preparation for welding portions is unnecessary, welding strain is small and a bead surface is smooth, is desirable. Practically, electron beam welding or laser beam welding is effective.

Once the welding has been finished, the sawtooth-like guide ring 51 is removed because fibers in paper material are apt to be caught thereby (FIG. 31(c)). It is to be noted that in a screen cylinder employing drawn materials for the rod-like members, since machining is not effected on the finished surface, projections which cause catching of fibers such as burrs which result from machining are not present, and so, execution of electrolytic grinding is not especially necessary.

In the method of making a screen cylinder according to the above-described embodiment of the present invention, the rod-like members 48 should not be limited to the preferred embodiment shown in FIGS. 26 to 30, but they could have any arbitrary cross-section configuration that is necessitated in view of the characteristic of the pressure type screen slit, and with respect to the method for making them also, a method other than a drawing method such as machining could be employed. Also, the working of the flange surfaces of the upper and lower flanges 49 and 50 could be effected after the welding between the rod-like members 48 and the flanges has been finished. The method of assembling the rod-like members 48 in a cylindrical form with a predetermined slit width, is not limited to the method of employing the guide ring 51 in the illustrated embodiment, but other methods such as inserting shim plates having a thickness equal to a predetermined slit width into upper and lower portions of slit openings, or the like, could be practiced. In addition, the guide ring 51 is not limited to the preferred embodiment shown in FIGS. 28 and 29, but it could be of any arbitrary shape that is adapted to the cross-section configuration of the rod-like members 48, and with regard to the method of making the guide ring 51 also, a laser beam working machine need not be employed.

Furthermore, the method for fixing the rod-like members 48 and the flanges 49 and 50 with each other is not limited to the welding method in the illustrated embodiment, but other methods such as diffusion bonding, friction pressure welding, brazing, adhesion, etc. could be employed. In addition, the welding method is also not limited to electron beam welding and laser beam welding, but other welding methods which fulfill necessary conditions, could be employed.

Figure 20:
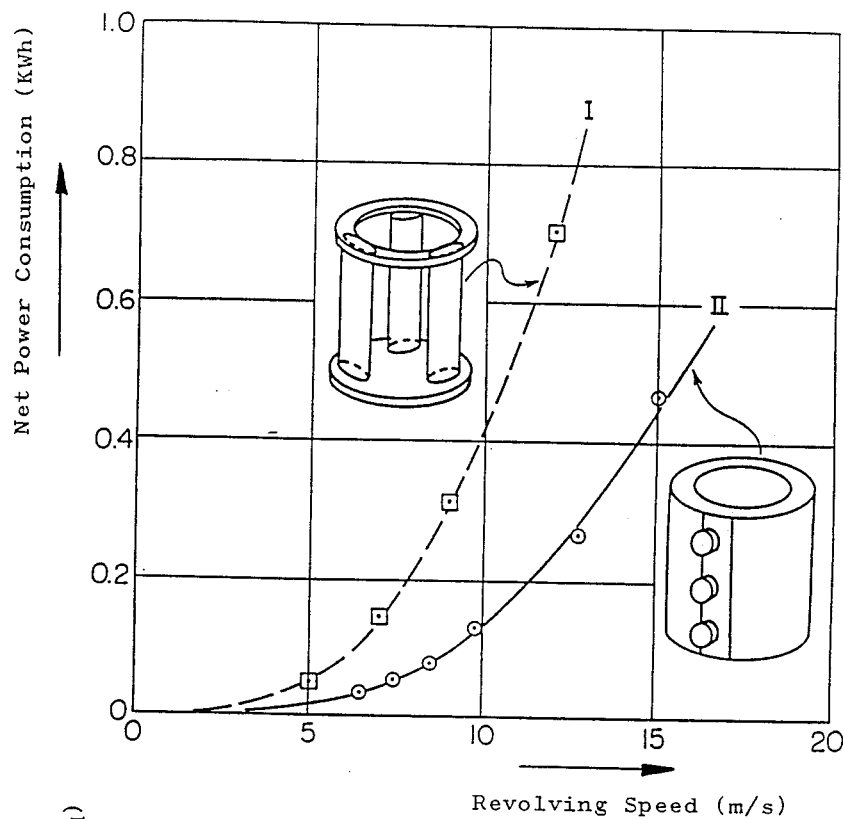
FIG. 20 is a diagram showing relations between a revolving speed and a net power consumption according to the present invention as well as in the prior art.

The present invention is constructed as described in detail above, and with respect to the effects of the invention, description will be made here in summary. That is, a first the, power necessitated for preventing the surface of the screen cylinder from being clogged by paper material can suffice at a small amount. FIG. 20 shows results of a comparative test between a rotor in the prior art (curve I) and a rotor having circular column protrusions according to the present invention (curve II) as conducted with respect to a model having a screen diameter of 250 mm. In this figure, if comparison is made at a revolving speed of 10 m/sec, it can be seen that in the rotor according to the present invention, the power consumption is reduced to about $\frac{1}{3}$ as compared to that in the prior art.

Figure 22:
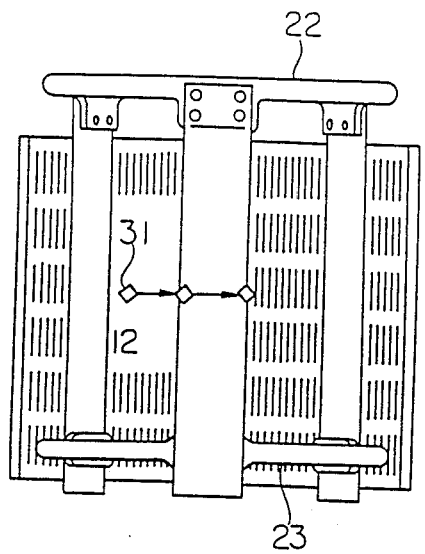
FIG. 22 is a front view showing a combination of a screen cylinder and hydrofoil members in the prior art.
Figure 23:
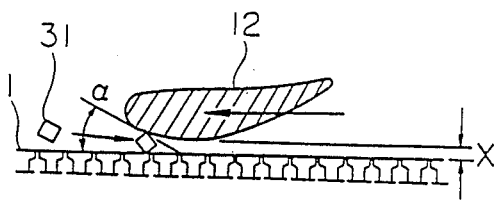
FIG. 23 is a horizontal cross-section view of an essential part in FIG. 22.

In the combination of the screen cylinder and the hydrofoil members in the prior art, since the front edge portion shown in FIG. 23 has an angle of attack $\alpha$, hard foreign matter 31 which is somewhat larger than a gap clearance X is liable to be caught, and since the caught hard foreign matter must always pass through the gap clearance portion because the hydrofoil members 12 extend continuously along the screen plate as shown in FIG. 22, there has been a shortcoming in that damage would be caused on both the screen cylinder surface and the hydrofoil members.

Figure 24:
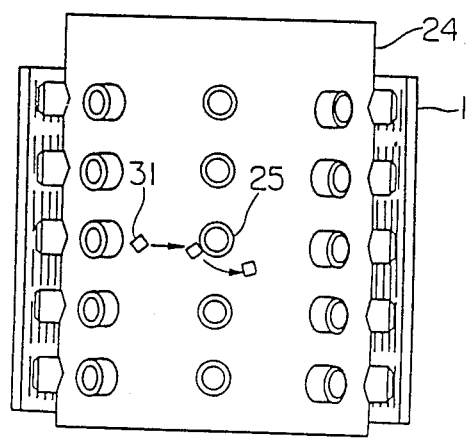
FIG. 24 is a front view showing a combination of a screen cylinder and a rotor which illustrates one preferred embodiment of the present invention.
Figure 25:
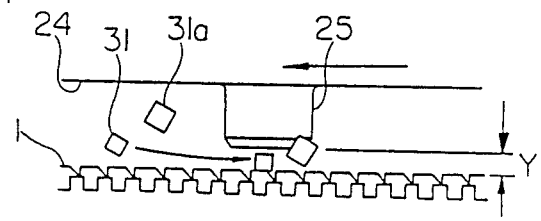
FIG. 25 is a horizontal cross-section view of an essential part in FIG. 24.
Figure 26:
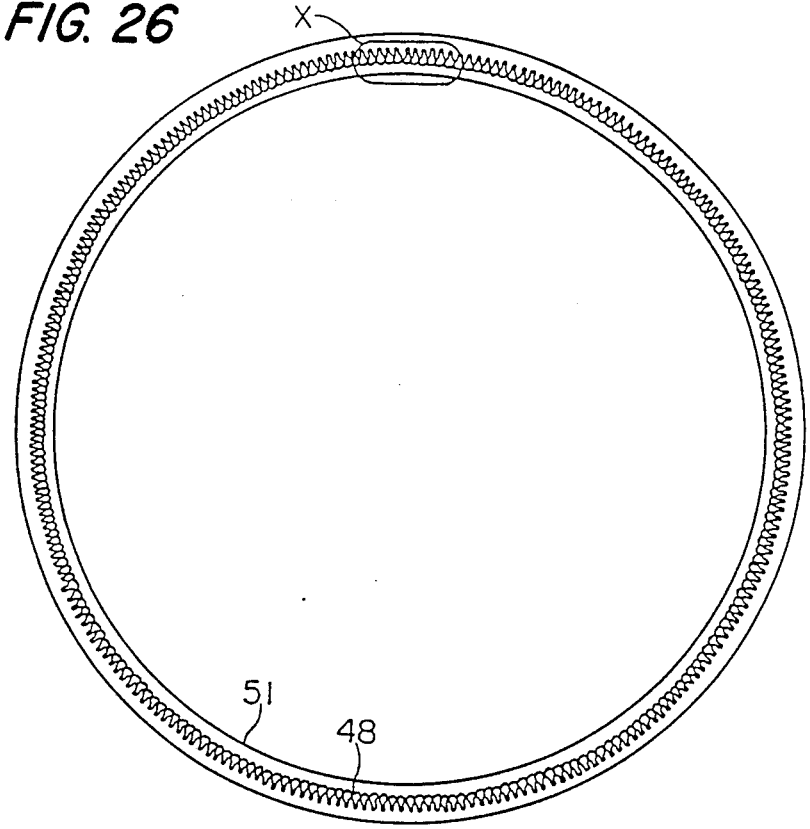
FIG. 26 is a horizontal cross-section view showing one example of a screen cylinder provided according to the present invention.
Figure 27:
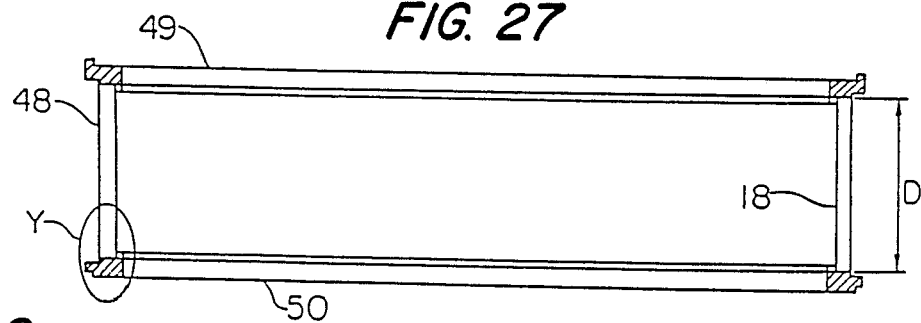
FIG. 27 is a vertical cross-section view of the same.
Figure 28:
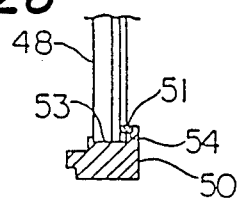
FIG. 28 is a detailed view of a portion Y in FIG. 27.
Figure 29:
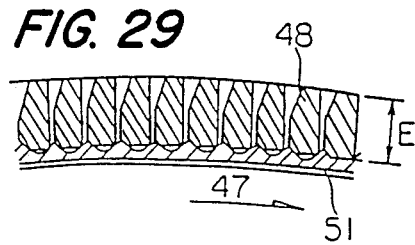
FIG. 29 is a detailed diagram of a portion X in FIG. 26.

On the other hand, in the combination of the screen cylinder and the hydrofoil members according to the present invention, since the protrusions are discrete as shown in FIGS. 24 and 25, hard foreign matter 31a which is somewhat larger than a gap clearance Y would easily pass around the protrusions. In addition, in contrast to the fact that the gap clearance X in the prior art structure shown in FIG. 23 is 1.5–2.5 mm, according to the present invention the performance can be revealed even in the case where the gap clearance Y is as broad as 4–5 mm, hence the sizes of hard foreign matter which may become an object of being caught would become large, and so, the probability of foreign matter being mixed is lowered. Accordingly, damage of the screen cylinder surface caused by catching of hard foreign matter can be prevented.

Furthermore, even in the event that hard foreign matter has been caught in the portion of the gap clearance Y due to any cause, damage of the screen cylinder surface can be perfectly prevented as a result of elastic deformation of the protrusions, by selecting non-metallic elastic material such as urethane rubber or the like as the material of the protrusions according to the present invention. Also, in the case of the rotor protrusions made of non-metallic elastic material, upon wear and damage thereof as a result of use over a long period, only the corresponding portion can be easily replaced by mounting them through fitting or bonding as shown in FIGS. 11 and 12.

Moreover, according to the present invention, after a flock of fibers has been stirred and disintegrated by separation of a flow, the fibers enter the slits. At the slit inlet openings, even if fibers should be caught by the slit inlet opening, at the next moment they would be pushed to flow in different directions by the separation effect of the flow along the screen plate surface, so that the fibers would be pealed off, and as a result, the fibers cannot be caught by the slit opening. Accordingly, clogging can be prevented, and since the corners of the slit inlet openings by which fibers were caught in the prior art structure are eliminated, the fibers can move jointly with the flow of liquid and easily pass through the slits. As a result, a yield of fibers can be greatly improved as seen in Table-1 which shows test results.

Figure 21:
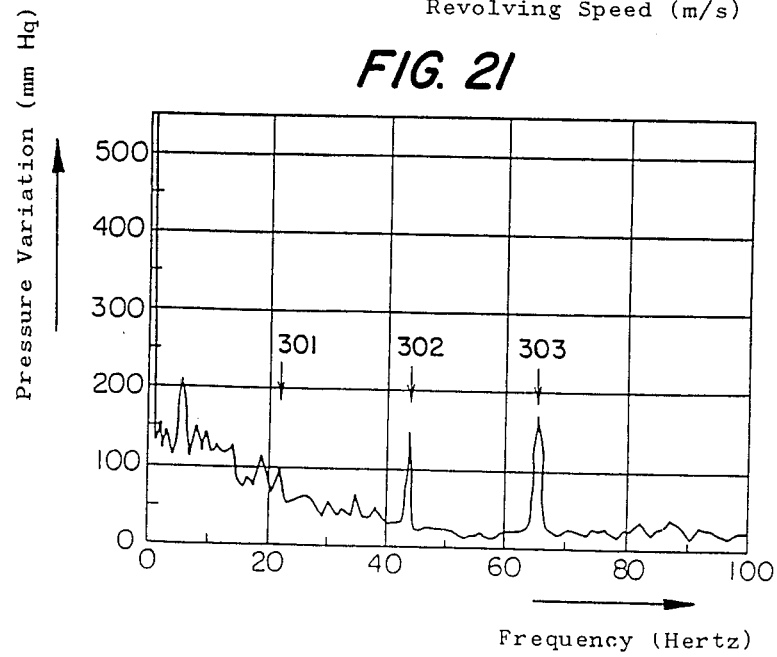
FIG. 21 is a diagram showing a relation between a frequency and a pressure variation according to the present invention.

Results of comparative tests conducted with respect to a combination of a screen cylinder of the prior art type having a screen diameter of 250 mm and hydrofoil members, and with respect to a combination of a screen cylinder of the same size according to the present invention which has chamfers on the downstream side of the associated circulating flow and a rotor, are shown in Table-1.

component) that is determined by a rotational speed of a rotor and a number of protrusion columns is 21.7 Hertz, but the peak of the pressure variation at this frequency is not clear in FIG. 21, and also it is of low level, so that it does not become an issue. In addition, though clear peaks are observed at the high frequency components of 2N and 3N, these frequencies are both higher than 30 Hertz, and due to the high frequency the peaks can be readily attenuated in the raw material pipings. Accordingly, in the case of the rotor according to the present invention, counter-measure against pulsation caused by a pressure type slit screen is unnecessary.

In addition, according to the present invention, since the screen cylinder is formed in such a manner that rod-like members having any arbitrary cross-section configuration are arrayed in a cylindrical form and the opposite ends thereof are fixed by flange members, a precision in a gap clearance of slit openings can be enhanced.

In other words, since the rod-like members are assembled in a cylindrical form from the initial stage with gap clearances equal to a predetermined slit width held therebetween, change of a slit width caused by bending work would not occur. Also, since joint portions in the longitudinal direction of the screen cylinder are not present, change of a slit width caused by thermal deformation upon welding would not arise, also. Accordingly, a slit width upon assembly can be maintained in itself until a finished state, so that a high precision in a gap clearance can be realized.

Furthermore, according to the present invention, a number of working steps is small and a working efficiency is excellent. More particularly, since edges are not formed at the opposite ends of slit openings, hand work by means of a file is unnecessary, and since joint portions in the longitudinal direction of the screen cylinder are not present, working of an additional slit is unnecessary. Still further, if rod-like members shaped through a drawing method are employed, then the surface thereof is uniform and smooth in "roughness", so that electrolytic grinding can be omitted. Accordingly, the number of working steps is small, and the working

TABLE 1

| Combination | | Slit Passing Speed | | | Test Conditions |
|---|---|---|---|---|---|
| | | 0.5 m/s | 1.0 m/s | 1.65 m/s | |
| Screen | Cleaning Device | | | | Paper Material: N 30% |
| Prior Art Structure | Hydrofoil Members × 3 | 74.5% | 79.5% | 74.6% | L 70% Concentration: 0.22–0.37% |
| One Side Chamfered | Rotor (Circular Cylindrical Protrusion × 3) | 97.1% | 95.7% | 96.8% | Reject Proportion: 13–16% Vol. Circumferential Velocity of the Cleaning Device: 14 m/s |

The test results are a representation of the ratio of a supplied paper material concentration to an accept paper material concentration in percent, and they nearly coincide with yields of fibers. From the results shown in Table-1, it can be seen that according to the present invention, yields of fibers can be greatly improved from 75% to 95% although they involve some distribution depending upon a slit passing speed.

Next, results of measurement for a pressure variation of a rotor having circular column protrusions according to the present invention, are shown in FIG. 21 (wherein 301 represents a 1N component, 302 represents a 2N component and 303 represents a 3N component). With reference to this figure, a fundamental frequency (1N time can be shortened, so that, as a result, a cheap screen cylinder whose manufacturing period is short, can be manufactured.

In addition, according to the present invention, making of a narrow slit width having any arbitrary cross-section configuration, is possible. More particularly, since rod-like members shaped through a drawing method or the like are employed, not to speak of a cross-section configuration of a slit portion such that inlet corner portions of a slit has been subjected to chamfering, even with respect to a more complex cross-section configuration also, the slit can be made without changing the number of working steps. Furthermore, as the slit width is realized by arraying rod-like members at a predetermined interval, a working efficiency would not be lowered even if the slit width becomes narrow, and even a screen cylinder having a narrow slit width of 0.25 mm or less can be easily manufactured.

Figure 34:
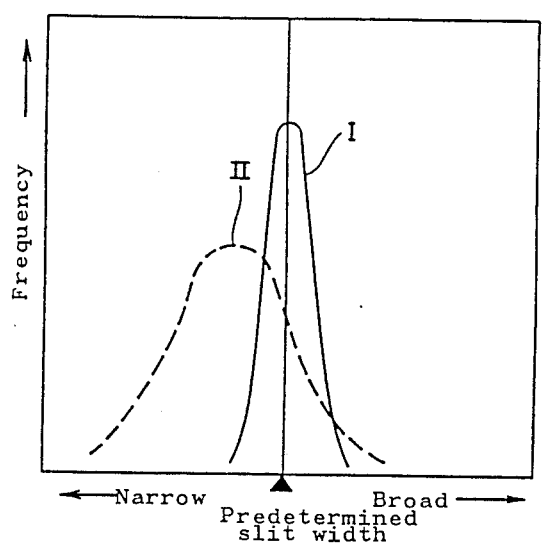
FIG. 34 is a distribution diagram for slit widths in screen cylinders according to the present invention as well as in the prior art.
Figure 46:
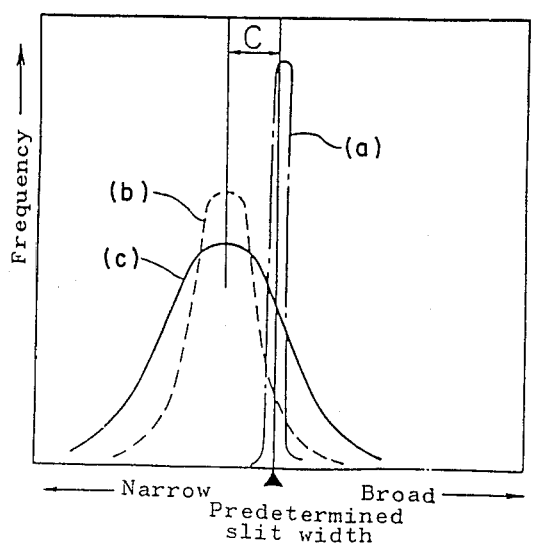
FIG. 46 is a diagram showing distribution curves of slit openings in a screen cylinder in the prior art.

As described above, according to the present invention, since a slit width upon assembly is in itself maintained until its finished state, a distribution curve of slit widths takes the form shown in FIG. 34 wherein curve I represents the manufacturing process according to the present invention and curve II represents the manufacturing process illustrated in curve e of FIG. 46, and thus a high precision in a gap clearance can be realized as compared to the method of making illustrated in curve e of FIG. 46. By way of practical example, results obtained when a screen cylinder having a diameter of 500 mm, a predetermined slit width of 0.2 mm and a pitch of 5.2 mm was made through the method shown in FIGS. 26–31 and a precision in a gap clearance was measured, were an average value of 0.195 mm and a standard deviation of 0.014 mm.

Figure 33:
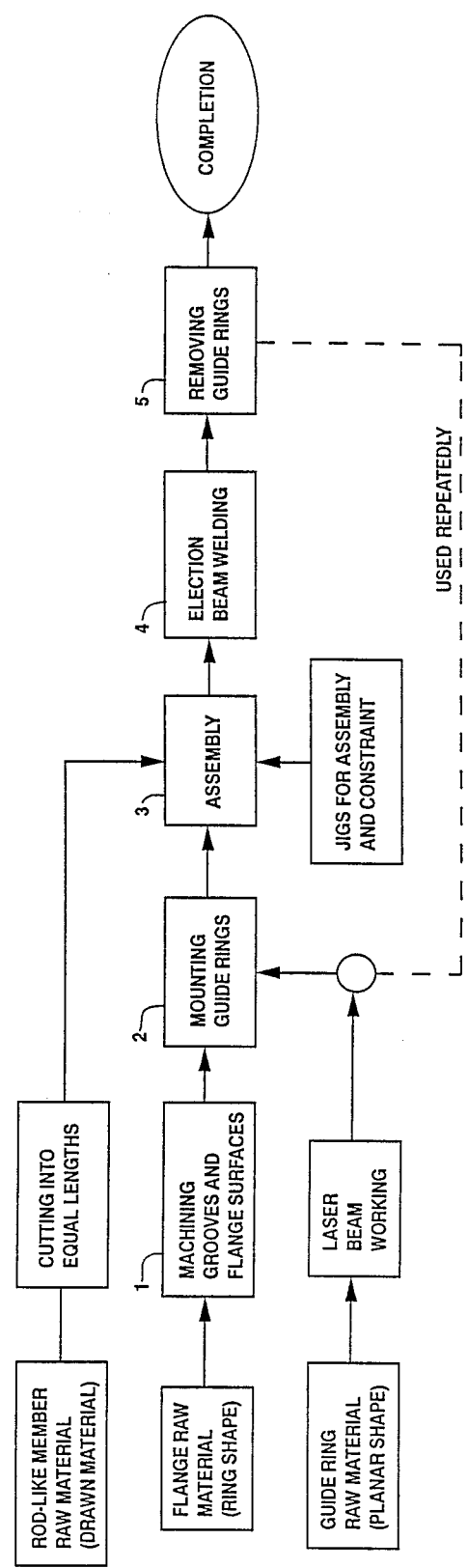
FIG. 33 is a block diagram showing a method for making a screen cylinder according to the present invention.
Figure 35:
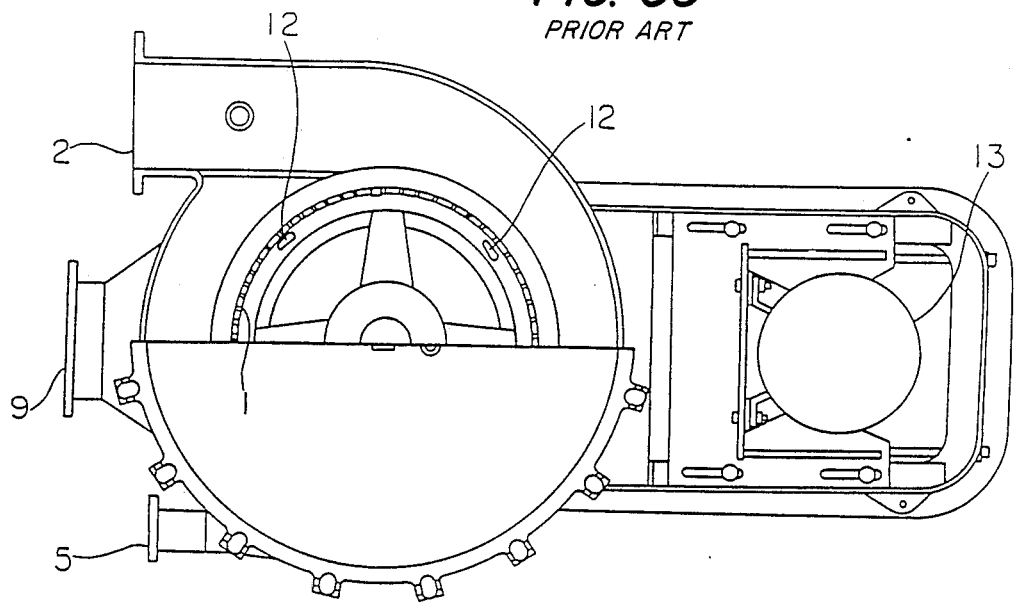
FIG. 35 is a plan view partly in cross-section of a pressure type slit screen in the prior art.

Also, upon practicing the present invention, if the rod-like members are manufactured by making use of drawn materials, then electrolytic grinding can be omitted, and hence, a small number of working steps can suffice. In FIGS. 32 and 33, principal manufacturing steps for a screen cylinder in which inlet corners of openings are chamfered, are compared between the prior art process and the process according to the present invention. FIG. 32 illustrates the case of the manufacturing process in the prior art, in which a total number of working steps is 14, while a minimum necessary number of steps indicated by bold line arrows is 13. FIG. 33 illustrates the case of the present invention which corresponds to the manufacturing process shown in FIGS. 26–31. A total number of working steps is 7 (a total number of working steps is 6 if guide rings are used repeatedly), a minimum necessary number of steps indicated by bold line arrows becomes 5, hence as compared to the manufacturing process in the prior art, the total number of working steps is reduced to ½, the minimum necessary number of steps is reduced to 1/2.6, a working time is also shortened, so that, as a result, a cheap screen cylinder having a short manufacturing period can be manufactured.

Furthermore, according to the present invention, screen cylinders having slit portions of any arbitrary cross-section configuration can be manufactured through the same number of working steps (in the manufacturing process in the prior art, if the cross-section configuration of the slit portions becomes complex, the number of working steps would be increased correspondingly). In addition, even if a slit width should become narrow, a working efficiency would not be lowered, but even a screen cylinder having a narrow slit width of 0.25 mm or less can be easily manufactured, provided that attention is paid to straightness of the rod-like members. While the present invention has been described with reference to the foregoing embodiments, it will be understood by those skilled in the art that various changes and modifications may be made thereto which fall within the scope of the appended claims.

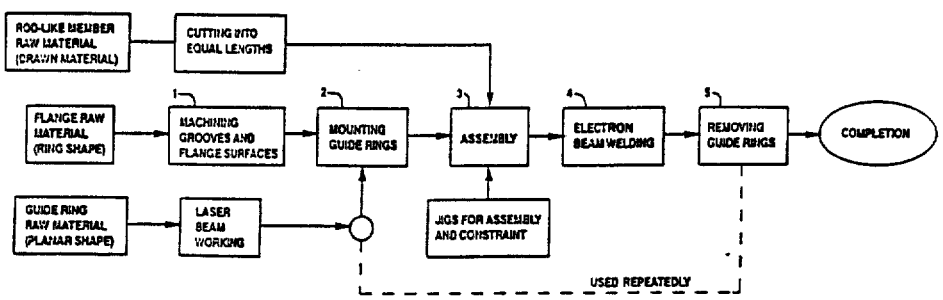

What is claimed is:

1. A pressure type slit screen apparatus comprising:
    a stirring chamber;
    a screen cylinder having an inlet side and an accepts side with a surface thereof on said inlet side facing the stirring chamber, said screen cylinder having slit openings therein which are larger in cross-sectional area on said accepts side than on said inlet side with one side of inlet corner portions of said slit opening being chamfered; and
    a cylindrical rotor rotatably disposed with a cylindrical surface thereof facing said screen cylinder, said cylindrical rotor having a large number of protrusions on said cylindrical surface facing said screen cylinder, each of said protrusions having a free end spaced radially from the cylindrical surface of said rotor and in close proximity to said surface of said screen cylinder.

2. A pressure type slit screen apparatus as claimed in claim 1, wherein said protrusions are formed of nonmetallic elastic material.

3. A pressure type slit screen apparatus as claimed in claim 1, wherein means comprising a plurality of through openings are provided in said cylindrical surface of said rotor for passage of liquid in said stirring chamber through said rotor so that macroscopic stirring is promoted in said stirring chamber.

4. A pressure type slit screen apparatus as claimed in claim 1, wherein said screen cylinder is constructed of a large number of rod-like members having a predetermined cross-section configuration, said rod-like members having opposite ends thereof arranged in a circular pattern with predetermined gap clearances between said rod-like members, and supports respectively fixed to the opposite ends of said rod-like members.

5. A pressure type slit screen apparatus as claimed in claim 2, wherein means comprising a plurality of through openings are provided in said cylindrical surface of said rotor for passage of liquid in said stirring chamber through said rotor so that macroscopic stirring is promoted in said stirring chamber.

6. A pressure type slit screen apparatus as claimed in claim 2, wherein said screen cylinder is constructed of a large number of rod-like members having a predetermined cross-section configuration, said rod-like members having opposite ends thereof arranged in a circular pattern with predetermined gap clearances between said rod-like members, and supports respectively fixed to the opposite ends of said rod-like members.

7. A pressure type slit screen apparatus as claimed in claim 3, wherein said screen cylinder is constructed of a large number of rod-like members having a predetermined cross-section configuration, said rod-like members having opposite ends thereof arranged in a circular pattern with predetermined gap clearances between said rod-like members, and supports respectively fixed to the opposite ends of said rod-like members.

8. A pressure type slit screen apparatus comprising:
    a stirring chamber;
    a rotor mounted for rotation in a circumferential direction about a rotational axis of said rotor, said rotor including a rotor drum having a surface thereof facing said stirring chamber and rotatable about said rotational axis, said rotor further including a plurality of protrusions extending radially from said surface of said drum, each of said protrusions having a free end spaced radially from said surface of said rotor drum; and
    a screen having an inlet side and an accepts side with a surface thereof on said inlet side facing said stirring chamber and in close proximity to said free ends of said protrusions on said rotor drum, said screen including slit openings therethrough which are larger in cross-section on said accepts side than on said inlet side, each of said slit openings being elongated in a direction parallel to said rotational axis of said rotor drum and being located between a pair of walls extending into said screen from said surface of said screen, one of said walls being located upstream with respect to said circumferential direction of rotation of said rotor and the other one of said walls being located downstream with respect to said circumferential direction of rotation of said rotor, said pair of walls at a location adjacent said inlet side being spaced further apart in a direction towards said surface of said screen.

9. The pressure type screen apparatus of claim 8, wherein each of said protrusions is of non-metallic elastic material.

10. The pressure type screen apparatus of claim 8, wherein said rotor drum includes means comprising a plurality of openings therethrough for passage of liquid in said stirring chamber through said rotor so that macroscopic stirring is promoted in said stirring chamber, said openings being spaced from said protrusions.

11. The pressure type screen apparatus of claim 8, wherein said rotor drum is cylindrical in cross section and said surface of said rotor drum comprises a radially outer periphery of said cylindrical rotor drum.

12. The pressure type screen apparatus of claim 8, wherein said screen is cylindrical in cross section and said surface of said screen comprises a radially inner periphery of said cylindrical screen.

13. The pressure type screen apparatus of claim 8, wherein one wall of said pair of walls extends perpendicularly from said surface of said screen.

14. The pressure type screen apparatus of claim 13, wherein said one of said walls extending perpendicularly from said surface of said screen is located downstream with respect to said circumferential direction of rotation of said rotor.

15. The pressure type screen apparatus of claim 8, wherein each of said protrusions is triangular in cross section over the entire length thereof.

16. The pressure type screen apparatus of claim 8, wherein each of said protrusions is cylindrical in cross section over the entire length thereof.

17. The pressure type screen apparatus of claim 8, wherein each of said protrusions is rectangular in cross section over the entire length thereof.

18. A pressure type slit screen apparatus comprising:
a stirring chamber;
a rotor mounted for rotation in a circumferential direction about a rotational axis of said rotor, said rotor including a rotor drum having a surface thereof facing said stirring chamber and rotatable about said rotational axis, said rotor further including a plurality of protrusions extending radially from said surface of said drum, each of said protrusions having a free end spaced radially from said surface of said rotor drum; and
a screen having an inlet side and an accepts side comprising a plurality of spaced-apart elongated members and support means for supporting said elongated members, each of said elongated members having an elongated surface forming part of a surface of said screen on said inlet side facing said stirring chamber and in close proximity to said free ends of said protrusions on said rotor drum, said screen including slit openings therethrough which are larger in cross-sectional area on said accepts side than on said inlet side, each of said slit openings comprising a space between one of said elongated members and an adjacent one of said elongated members, each of said slit openings being elongated in a direction parallel to said rotational axis of said rotor drum and being located between a pair of walls extending into said screen from said surface of said screen, said pair of walls comprising opposed surfaces of a pair of said elongated members, one of said walls being located upstream with respect to said circumferential direction of rotation of said rotor and the other one of said walls being located downstream with respect to said circumferential direction of rotation of said rotor, said pair of walls at a location adjacent said inlet side being spaced further apart in a direction towards said surface of said screen.

19. The pressure type screen apparatus of claim 18, wherein said elongated members are identical in cross-section and said support means comprises a pair of spaced-apart support members, said support members being located at opposite ends of said elongated members.

20. The pressure type screen apparatus of claim 19, wherein each of said elongated members is thinner in cross section in a direction towards said surface of said screen, one of said walls formed by said respective surface of one of said elongated members extending perpendicularly from said surface of said screen and being located upstream with respect to said circumferential direction of rotation of said rotor.

* * * * *

UNITED STATES PATENT AND TRADEMARK OFFICE
CERTIFICATE OF CORRECTION

PATENT NO.   :   4,832,832                          Page 1 of 2

DATED        :   May 23, 1989

INVENTOR(S)  :   Haruyoshi FUMIWARA et al

It is certified that error appears in the above-identified patent and that said Letters Patent is hereby corrected as shown below:

In the drawings, Figure 33 is to be corrected and replaced by a proper Figure 33 as shown on the attached sheet.

Signed and Sealed this

Fourteenth Day of May, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. :   4,832,832

DATED      :   May 23, 1989

INVENTOR(S):   Haruyoshi FUJIWARA et al.

It is certified that error appears in the above-identified patent and that said Letters Patent is hereby corrected as shown below:

In the drawings, Figure 33 is to be corrected and replaced by a proper Figure 33 as follows:

FIG. 33

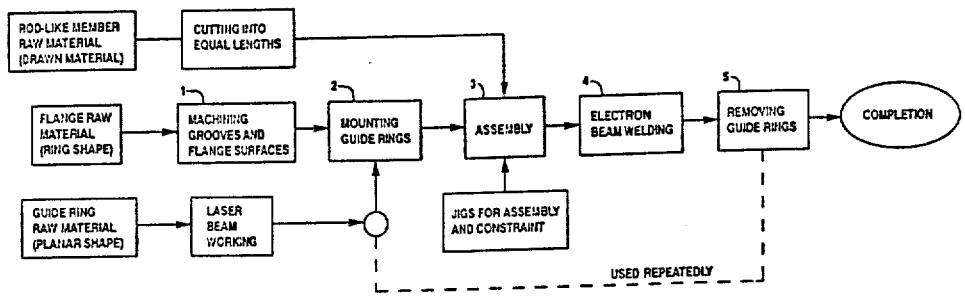

UNITED STATES PATENT AND TRADEMARK OFFICE
CERTIFICATE OF CORRECTION

PATENT NO. : 4,832,832

DATED : May 23, 1989

INVENTOR(S) : Haruyoshi FUJIWARA et al.

Page 1 of 2

It is certified that error appears in the above-identified patent and that said Letters Patent is hereby corrected as shown below:

In the drawings, Figure 33 is to be corrected and replaced by a proper Figure 33 as shown on the attached sheet.

This certificate supersedes Certificate of Correction issued May 14, 1991.

Signed and Sealed this

Twenty-sixth Day of November, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,832,832

DATED : May 23, 1989

INVENTOR(S) : Haruyoshi FUJIWARA et al

Page 2 of 2

It is certified that error appears in the above-identified patent and that said Letters Patent is hereby corrected as shown below:

*FIG. 33*